US006650621B1

(12) United States Patent
Maki-Kullas

(10) Patent No.: US 6,650,621 B1
(45) Date of Patent: Nov. 18, 2003

(54) LOAD BALANCING ROUTING ALGORITHM BASED UPON PREDEFINED CRITERIA

(75) Inventor: Jukka Maki-Kullas, Kirkkonummi (FI)

(73) Assignee: Stonesoft Oy, Espoo (FI)

(*) Notice: Subject to any disclaimer, the term of this patent is extended or adjusted under 35 U.S.C. 154(b) by 0 days.

(21) Appl. No.: 09/412,867

(22) Filed: Oct. 5, 1999

(30) Foreign Application Priority Data

Jun. 28, 1999 (FI) .................................................. 991470

(51) Int. Cl.[7] ........................... H04L 12/26; H04L 12/56

(52) U.S. Cl. ........................ 370/238; 370/392; 370/401

(58) Field of Search ................................ 370/400, 389, 370/392, 252, 401, 465, 254, 255, 351, 238, 238.1, 237, 229, 230, 235, 236.1; 709/102, 104, 105, 236

(56) References Cited

U.S. PATENT DOCUMENTS

| 4,884,263 | A |   | 11/1989 | Suzuki ........................ 370/16 |
| 4,953,162 | A |   | 8/1990 | Lyons et al. ............... 370/94.1 |
| 5,511,168 | A | * | 4/1996 | Perlman et al. ............. 395/200 |
| 6,446,121 | B1 | * | 9/2002 | Shah et al. .................. 709/224 |
| 6,457,054 | B1 | * | 9/2002 | Bakshi ........................ 709/227 |

OTHER PUBLICATIONS

Akkiraju, et al., *"Enabling Enterprise Multihoming with Cisco IOS Network Address Translation,"* 1997, pp. 1–25.
Yamamoto, K., *"New Multi–Home Technologies,"* Jan. 13, 1999, pp. 1–5.
Greenfield, David, *"Radware Linkproof,"* Dec. 1999, pp. 1–2.

* cited by examiner

*Primary Examiner*—Chau Nguyen
*Assistant Examiner*—Soon-Dong Hyun
(74) *Attorney, Agent, or Firm*—Ronald Craig Fish; Ron Fish

(57) ABSTRACT

The invention relates to distribution of IP traffic between more than one route between a node and an IP network. The invention is concerned with a new method for distribution of connections between a plurality of possible routes for transmission of IP packet traffic between a source node and end nodes, each of the routes being associated with a plurality of IP addresse. According to the invention, a route is selected for a new connection to be established between the source node and an end node for transmission of packet traffic, the selected route is taken into use by translating source IP addresses of packets transmitted from the source node to said end node to an IP address associated with the selected route, and said selection of a route is performed on the basis of predefined criteria. Preferably, the selection of the route is performed on the basis of round trip times measured by a new method using packet replication.

18 Claims, 6 Drawing Sheets

LOAD BALANCING ROUTING ALGORITHM BASED UPON PREDEFINED CRITERIA

TECHNICAL FIELD OF THE INVENTION

The invention relates to load balancing of IP traffic between more than one route between a node and an IP network. More particularly, the invention relates to such a method as described in the preamble of the independent method claim.

BACKGROUND OF THE INVENTION

IP network technology is presently in widespread use, the Internet being a manifest example of a network realized using Internet Protocol (IP). The IP protocol provides a basic packet data transfer mechanism without error checking, acknowledgments or flow control. Other protocols used in combination with the IP protocol such as the TCP protocol are used to provide a reliable data transmission mechanism with transmission error correction, flow control and many other functions. The IP protocol is defined in the specification RFC 791, and the TCP protocol is defined in the specification RFC 793. An introduction to these protocols is presented in RFC 1180. In the following, a short overview of these protocols are given.

The IP protocol version 4 (IPv4) defined by RFC 791 has a limited address space due to the source and destination addresses being only 32 bits long. The current expansion of the Internet and the development of technology, the address space is filling out quickly. Therefore, version 6 of the IP protocol (IPv6) has been designed. The addresses in IPv6 are 128 bits long, allowing a vastly larger address space. There are also further motivations behind IPv6 and other differences between IPv4 and IPv6. The IPv6 protocol is described in the specification RFC 1883. Some details of the TCP and IP protocols relevant to the present invention are described in the following with reference to FIGS. 1, 2, and 3.

In the IP protocol, data is transmitted in so called datagrams, which contain a header part and a payload data part. FIG. 1 shows the structure of an IPv4 header. In the following only some of the header fields are described. A detailed description can be found from the above mentioned RFC 791. The first field, the four bits long version field, contains the version number which for IPv4 is 4. The total length field gives the length of the datagram, header and data part combined, as the number of octets i.e. groups of 8 bits. The source and destination addresses specify the IP address of the sender and the intended receiver. Various options can be specified in the options field, which may vary in length from datagram to datagram. The number of different options specified in the options field may as well vary. The options field is not mandatory, i.e. in some datagrams there may be no options field at all. The padding field is used to ensure that the header ends on a 32 bit boundary. The padding field is filled with zeroes. After the padding field comes the payload data part, whose length can be found out by the recipient of the datagram by subtracting the length of the header from the value of the total length field.

FIG. 2 illustrates the structure of an IPv6 header. The IPv 6 header is simpler than the IPv4 header, allowing faster processing of datagrams in transmission nodes. The first four bits of the header comprise the version field, which for IPv6 contains the value 6. The payload length field specifies the length of the data part in octets. The next header field specifies the type of any header following this header. The next header may for example be a TCP header in case the IP datagram carries a TCP packet, or an extension header. The source and destination address fields, each consisting of four 32-bit words giving a total of 128 bits for each address, specify the sender and the intended receiver of the datagram. Instead of an options field, inclusion of optional data in the header is provided in IPv6 by so called extension headers. Various extension header types are described in RFC 1883. There may be zero, one or more than one extension headers in an IPv6 datagram.

FIG. 3 illustrates the structure of a TCP header. The most relevant fields are described in the following. The other fields in a TCP header are described in the above mentioned RFC 793.

The TCP header indicates a destination port number at the receiving host, to which the packet is directed. The TCP protocol makes it possible for many different services to exist at a single IP address, by introducing the concept of a port. A program can listen to a specific port, and receive any data sent to that port. Conversely, a program can send a packet to a specific port on a distant host. Therefore, the destination port number defines which service or program will receive the packet at the host specified by the IP address. Similarly, the source port number indicates, which service or program sent the TCP packet.

The TCP data octets sent by a host are numbered sequentially. The number of the first octet of data in the data part is included in the TCP header in the sequence number field. Based on this number, the receiving second host can check whether TCP packets have arrived through the transmission network in the right order, and if any packets are missing. The second host conventionally sends an acknowledgment to the first host for each received packet. The acknowledgment message is included in a normal TCP packet sent by the second host to the first host. The acknowledgment is indicated by the ACK flag and the acknowledgment number. The acknowledgment number is the sequence number of the next octet, which the sender of the packet is expecting to receive from the other end. If there is no other data to be sent from the second host to the first host, the payload data part can be empty in such an acknowledgment packet. If the second host is transmitting data to the first host, the acknowledgment can be indicated in the header of a packet containing some payload data. Therefore, the ACK messages do not always add transmission load. If a host does not receive an acknowledgment for some data within a timeout period, the data is retransmitted.

The data part follows the TCP header. The length of the data part is carried by the IP protocol, therefore there is no corresponding field in the TCP header.

Due to the small number of IP addresses available in the IPv4 protocol, a technique known as network address translation (NAT) is used. With NAT, a private network such as the local area network of a company can be connected to the public Internet using only a small number of IP addresses of the public Internet, while allowing almost free use of IP addresses for traffic within the private network. Sessions with nodes in the public Internet are initiated from the private network. The network element connecting the two networks and performing the NAT function stores the source address of the initiating node within the private network, and replaces it by one of the small number of IP addresses of the public Internet. The network element stores the pair of an internal address and a public address, and performs source address translation for packets traversing from the internal node to the public Internet and destination address translation for packets traversing from the public Internet to the internal node. The network element retains the pair of addresses i.e. the binding until the internal node terminates all its connections to the public Internet, whereafter the network element may allocate the public address for use by another node of the internal network. The NAT function may also use the TCP port address in translation, whereby a binding specifies the pairing of an internal IP address and TCP port and an external IP address and a TCP port. Use of TCP ports in translation is used especially in the typical situation, in which the private traffic uses only one IP address of the public Internet. In such a situation, packets belonging to different connections from/to different hosts in the private network are kept separate by using different TCP ports for the connections.

The NAT functionality can also be used to increase the security of the internal network, since the NAT function hides the internal addresses, whereby the structure of the internal network is more difficult to deduce from the outside.

The use of more than one route between an internal network and an external network is also known. FIG. 4 shows an example of such a configuration. FIG. 4 shows an internal IP network 10, an external network 40, a network element 20, three different routes 30 between the network element 20 and an external network 40, and a node 50 in the external network. Typically each of the routes 30 correspond to an Internet Service Provider (ISP). The network element 20 can have a modem connection or even a fixed high speed connection to each of the ISP:s 30. The main advantages of using more than one route to the Internet are the higher transmission capacity of more than one route and reliability: if one of the routes 30 fail, the traffic can be directed to proceed via two other routes. Typically, the network element 20 also performs network address translation.

A known way to divide the traffic between the internal network 10 and the external network 40 is the so called Multihomed AS (Autonomous System) configuration. In Multihomed AS configuration, a route to specific destination in the Internet is selected based on the path information received by routers via Border Gateway Protocol (BGP-4) protocol. The BGP-4 protocol is described in detail in RFC 1771. However, there are limitations in this approach. There is no way to guarantee that the selected route has the best performance because the route is selected only based on destination IP address. Additionally the BGP4 protocol does not respond quickly to changes in the network topology, which may cause outages on connections to parts of the Internet.

Network address translation can also be used for load sharing. One such method is described in RFC 2391 "Load Sharing using IP Network Address Translation (LSNAT)". In the method, a new session is directed to a certain server in a pool of servers using the NAT technique. RFC 2391 also discloses some common algorithms for making load sharing decisions, i.e. to which server a certain connection is to be directed. Some examples of such algorithms are:

Round-Robin algorithm, i.e. new connections are directed to the servers in a repeating sequence. This algorithm has the drawback, that differences in the load of servers are not taken into account.

Least Load first algorithm, i.e. the server with least number of sessions bound to it is selected to service a new session. This algorithm has the drawback, that differences in the resource requirements of the new sessions are not taken into account, and that the capacities of the servers are neither taken into account.

Least traffic first algorithm, in which the volume of traffic of each server is measured by monitoring packet or byte count transferred by the server over a period of time.

Least Weighted Load first algorithm, in which different session types are given different weights, and servers having differing capacities are given different weights. The total weight of current session on each server is calculated, and the result is divided by the capacity weight value. A new session is directed to such a server, which has the smallest result value.

Response time monitoring algorithm, in which each server is periodically sent a packet, and the time elapsed until receiving the response packet is used as a measure of load. This algorithm has the drawback, that the load may vary between consecutive monitoring times, whereby the measured response time might not always represent the present situation. The accuracy may naturally be increased by decreasing of the testing interval, but this increases the traffic load.

Some further load sharing algorithms disclosed in RFC 2391 take into account the cost of accessing a server in combination with the previous algorithms.

The pat. U.S. Pat. No. 5,371,852 shows an example of an application of techniques described in RFC 2391. The patent discloses a system, which translates addresses in ingoing and outgoing packets between a cluster of computer nodes and an external network, making the cluster of computer nodes to appear as a single node to the external network.

The prior art does not disclose a method for load sharing of IP traffic between a number of routes, which method is transparent for the communicating parties, adjusts quickly to changes in the properties of the routes, and does not require a large processing power and data transfer capacity. A new solution is clearly needed.

SUMMARY OF THE INVENTION

An object of the invention is to realize a method for load sharing of IP traffic between a number of routes between a computer node and an IP network. A further object of the invention is to realize a method for finding the fastest route among a number of routes from a computer node to a destination in an EP network.

The objects are reached by replicating connection setup packets through each route to be tested, ensuring that reply packets come back through the same route, and by selecting the fastest route.

The method according to the invention is characterized by that, which is specified in the characterizing part of the independent method claim. The system according to the invention is characterized that, which is specified in the characterizing part of the independent claim directed to a system. The network element according to the invention is characterized by that, which is specified in the characterizing part of the independent claim directed to a network element. The dependent claims describe further advantageous embodiments of the invention.

The invention is concerned with a new method for distribution of connections between a plurality of possible routes for transmission of IP packet traffic between a source node and end nodes, each of the routes being associated with a plurality of IP addresse. According to the invention, a route is selected for a new connection to be established between the source node and an end node for transmission of packet traffic, the selected route is taken into use by translating source IP addresses of packets transmitted from the source node to said end node to an IP address associated with the selected route, and said selection of a route is performed on the basis of predefined criteria.

Preferably, the selection of the route is performed on the basis of round trip times measured by a new method using packet replication. One or more IP packets carrying connection setup messages of a second protocol used on top of the IP protocol are replicated to traverse to the same end node in the external net work through the available routes. The source addresses of the replicated packets are translated to addresses corresponding to the particular route used for transmission of the particular replicated packet to ensure, that the return packets come back the same route. The route that provides the fastest response times from the end node is selected to be used for the new connection. The response times can be determined from the transmission of the initial packet to the reception of the response packet to the initial packet, or to the reception of a certain later packet, such as the first packet after setup signalling containing payload data.

BRIEF DESCRIPTION OF THE DRAWINGS

The invention is described in more detail in the following with reference to the accompanying drawings, of which

Same reference numerals are used for similar entities in the figures.

DETAILED DESCRIPTION

Figure 1:
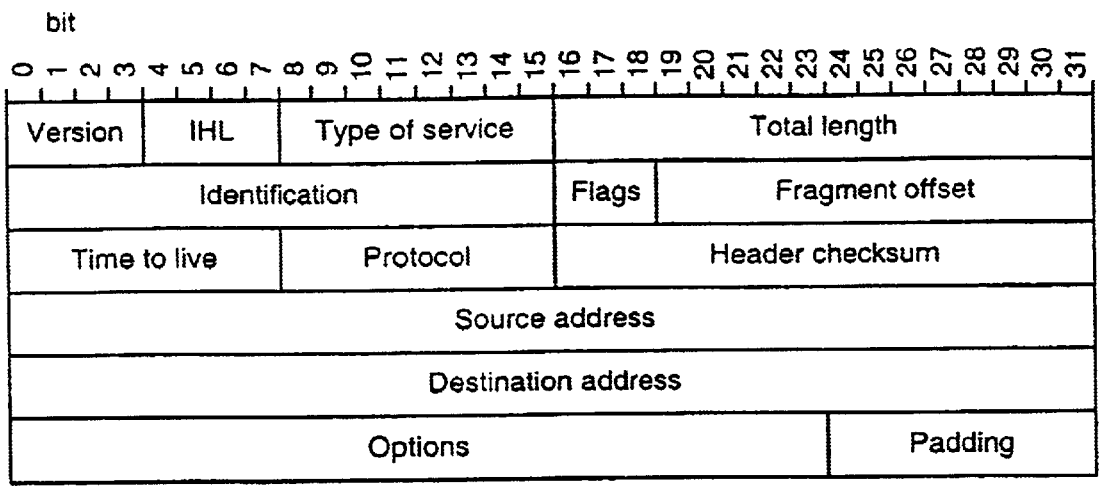
FIG. 1 illustrates the structure of an IPv4 header.
Figure 3:
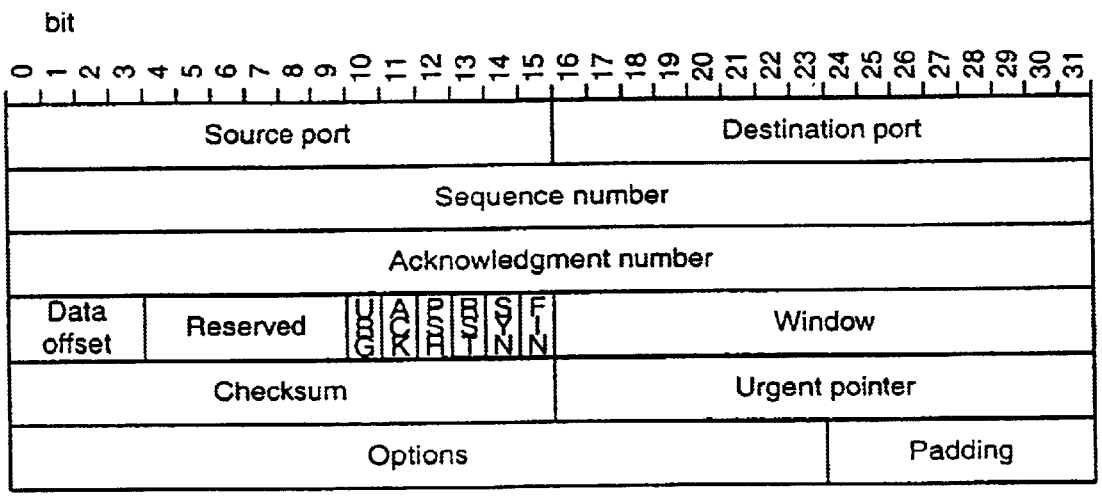
FIG. 3 illustrates the structure of a TCP header.
Figure 2:
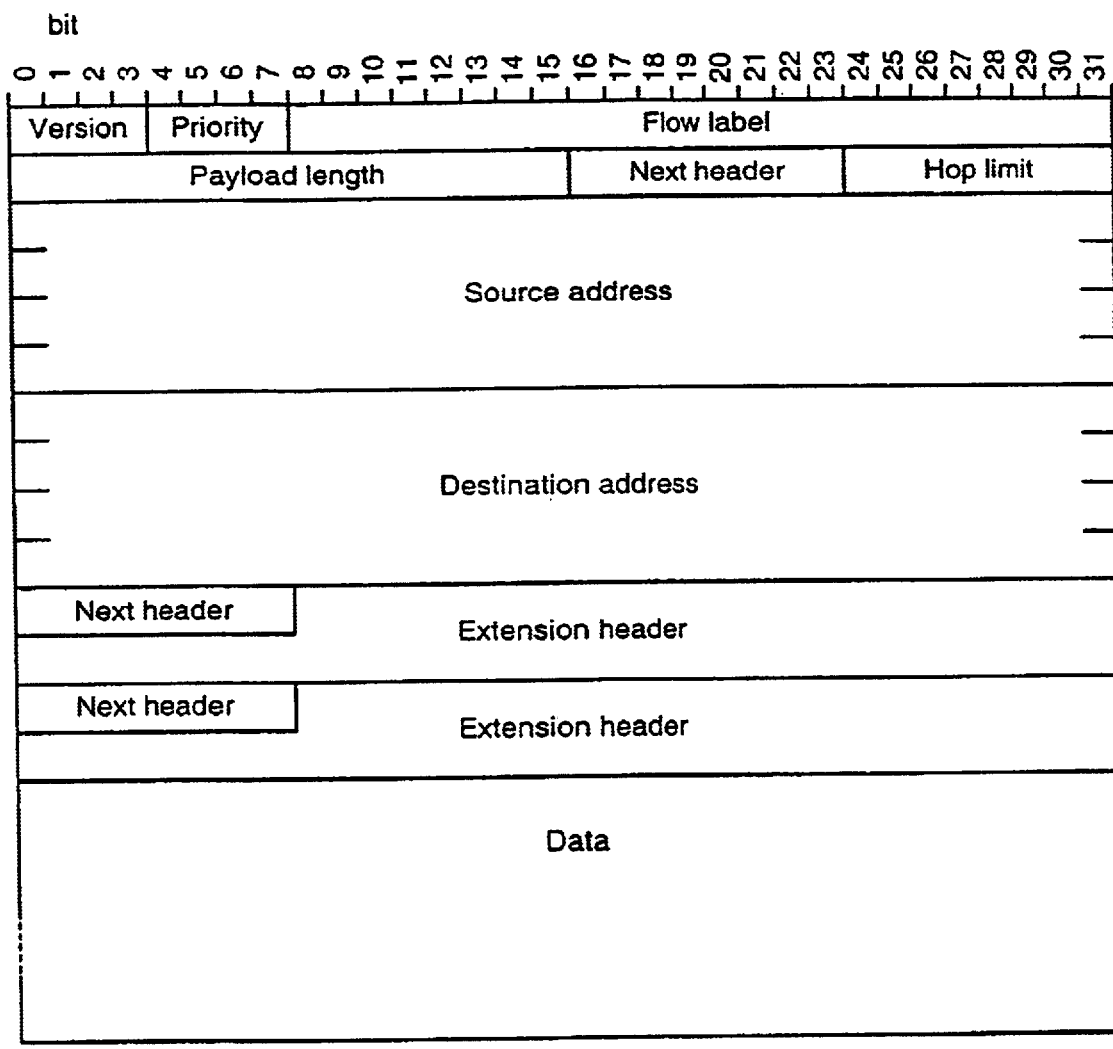
FIG. 2 illustrates the structure of an IPv6 header.
Figure 4:
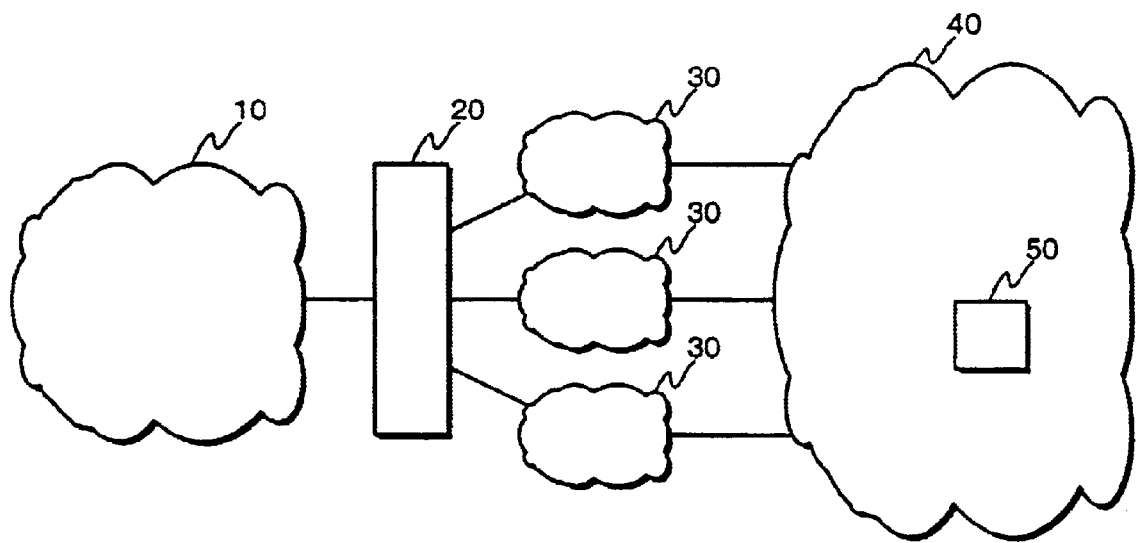
FIG. 4 illustrates a configuration, in which a private network or a computer node is connected to an external network via multiple routes.
Figure 5:
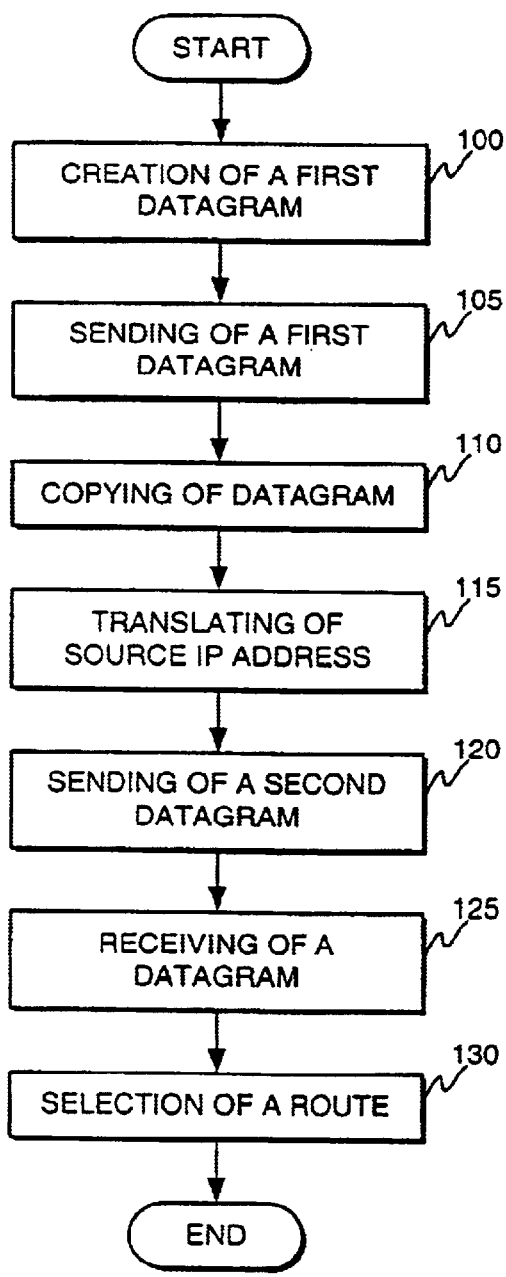
FIG. 5 illustrates a flow chart of a method according to an advantageous embodiment of the invention.

FIG. 5 shows an example of a method according to an advantageous embodiment of the invention. FIG. 5 shows an exemplary flow chart according to a method for balancing the load of connections between at least two routes between a source and an IP network, which connections use the IP protocol and at least one second protocol. Each of the at least two routes is associated with a plurality of IP addresses. Each route may be for example a route via a certain ISP, which has its own IP address space registered for the ISP for use by the parties who access the IP network such as the Internet via the ISP.

According to FIG. 5 the method comprises at least steps, in which a first IP datagram comprising a setup message of a second protocol is created 100 for initiating a new connection to an end node using said second protocol, said first IP datagram is sent 105 through a first route of the routes between the source node and said end node, said first IP datagram is copied 110 for creating a second IP datagram for sending through a second route of the routes between the source node and said end node, the source IP address of said second IP datagram is translated 115 to an IP address selected from the plurality of IP addresses associated with said second route, said second IP datagram is transmitted 120 via said second route to said end node, a first datagram comprising information of a predefined type is received 125 from said end node via one of the routes, and the route from which said first datagram comprising information of a predefined type is received is selected 130 as the route to be used.

The method may further comprise a step, in which the source IP address of said first IP datagram is translated to an IP address selected from the plurality of IP addresses associated with said first route. However, that step might not always be necessary, as for example in such a configuration, where the first route is the principal connection from a source network to the IP network, and the internal IP addresses of the source network can be used in the IP network as well without any need of network address translation.

The order of procedural steps shown in FIG. 5 is only an example, and is not intended to limit the invention in any way. For example, the second IP datagram may be created before the first IP datagram is sent. Further, the method may comprise steps, in which further copies of the IP datagram are created, their source IP addresses translated, and sent through further routes to said end node. For clarity, only two routes are shown in FIG. 5. The invention is not limited to any specific number of routes. Naturally, there needs to be at least two routes in order to allow selection of a route.

In an advantageous embodiment of the invention, said first datagram comprising information of a predefined type is a first response datagram sent by said end node as a response to one of said first and second IP datagrams.

Advantageously, connection setup signalling according to said second protocol is continued via the selected route. The connection setup signalling via the other route or other routes is preferably aborted for example by sending a connection reset signal or a corresponding signal.

Figure 6:
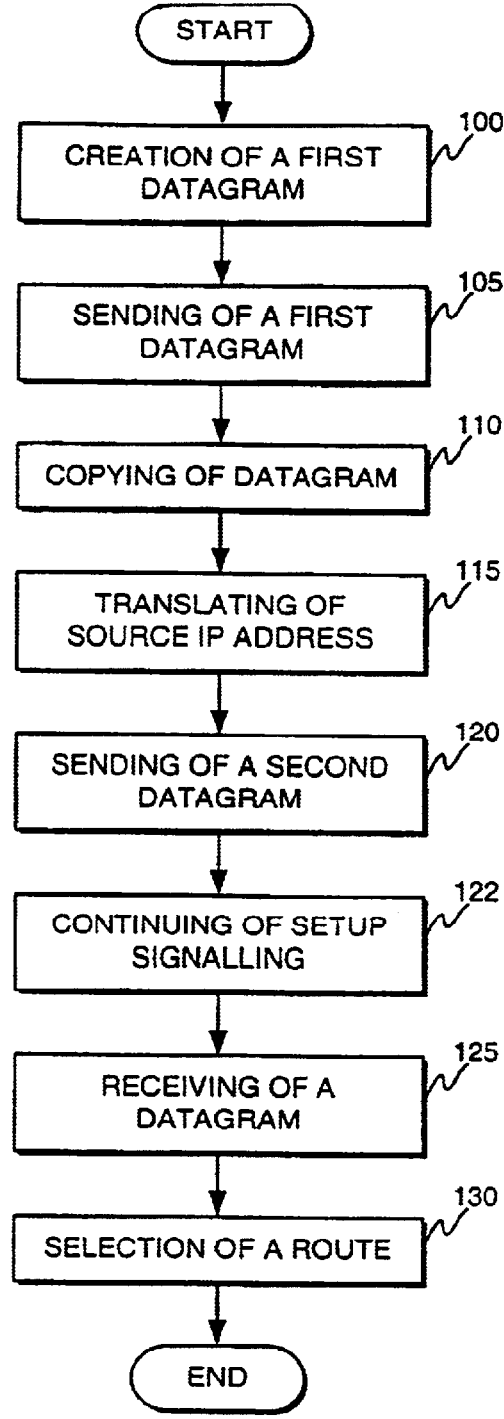
FIG. 6 illustrates a flow chart of a method according to a further advantageous embodiment of the invention.

FIG. 6 illustrates a flow chart of a method according to a further advantageous embodiment of the invention. According to FIG. 6 the method comprises at least steps, in which a first IP datagram comprising a setup message of a second protocol is created 100 for initiating a new connection to an end node using said second protocol, said first IP datagram is sent 105 through a first route of the routes between the source node and said end node, said first IP datagram is copied 110 for creating a second IP datagram for sending through a second route of the routes between the source node and said end node, the source IP address of said second IP datagram is translated 115 to an IP address selected from the plurality of IP addresses associated with said second route, said second IP datagram is transmitted 120 via said second route to said end node, after sending said first and second IP datagramns, connection setup signalling procedure is continued 122 via said first and said second route, a first IP datagram containing payload data according to the second protocol is received 125 from said end node via one of said first and said second route, and the route from which said first IP datagram containing payload data according to the second protocol is received is selected 130 to be used for the new connection.

In the step of continuing 122 the connection setup signalling, the IP datagrams comprising setup signalling are replicated as in steps 110 and 115 for transmission through the second route.

The embodiment according to FIG. 6 has an advantage in case of the second protocol being the TCP protocol. Some transparent proxies may participate actively in the setup of a TCP connection, i.e. send by themselves a SYN+ACK packet to the originating source, before such a packet is received from the end node. If such a proxy or another network element participating actively in the setup of TCP connections is within a route to the end node, measuring the round-trip time from the reception of the SYN+ACK packet at the source may give erroneous results. Therefore, waiting until the first payload data packet can in some cases be advantageous, since payload data originates only from the end node.

In a preferred embodiment of the invention, said second protocol is the TCP protocol. This is advantageous at the time of writing this patent application, since the majority of data traffic in the Internet is HTTP (HyperText Transfer Protocol) traffic, and HTTP protocol is used on top of the TCP protocol. Therefore, the new connection whose route is selected according to the invention may be a TCP connection for transmitting HTTP traffic.

Figure 7:
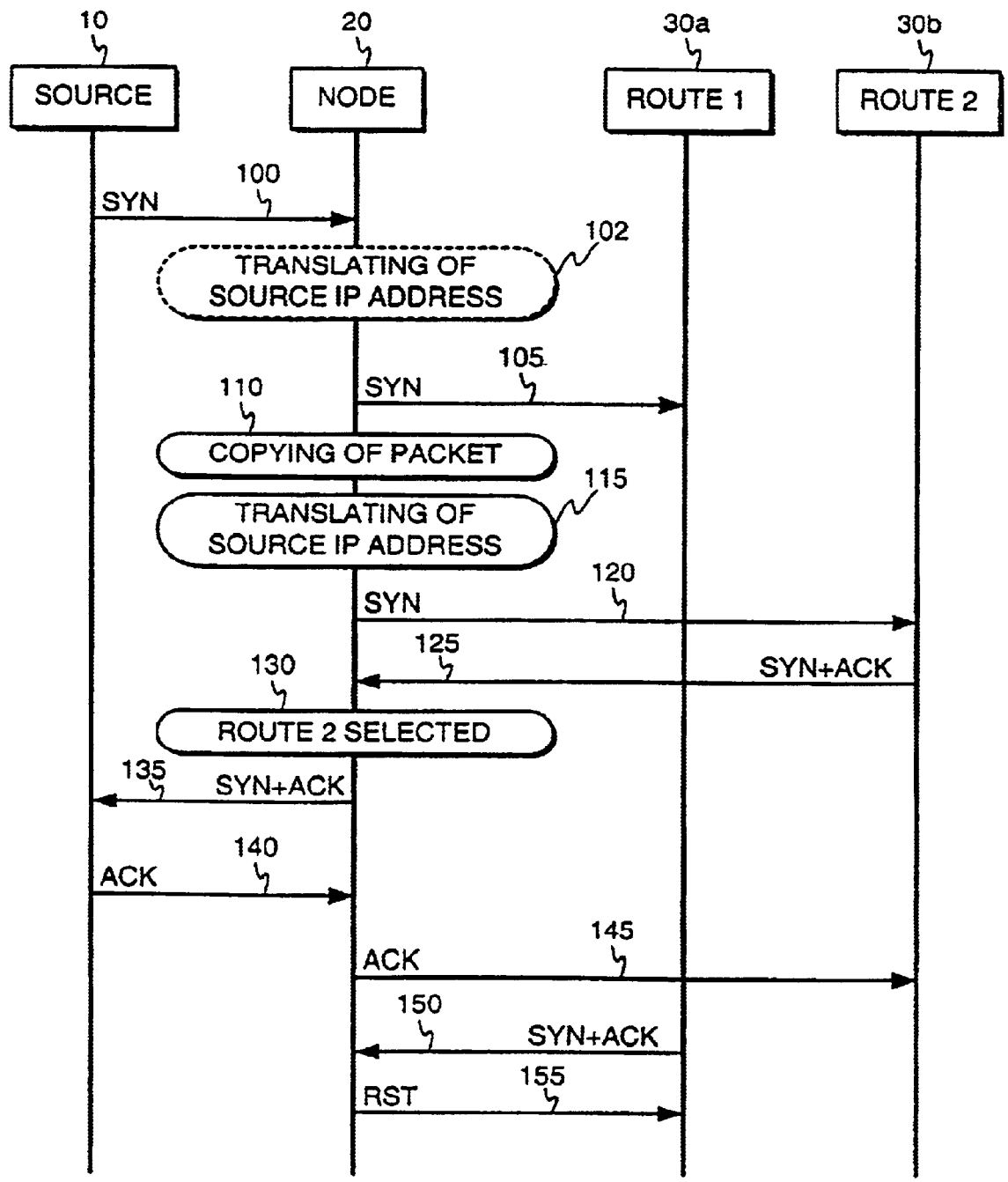
FIG. 7 illustrates signalling according to an advantageous embodiment of the invention.

FIG. 7 shows signalling between a source 10, a node 20, and two routes ROUTE 1 30a and ROUTE 2 30b. The node may be for example a gateway computer node connecting a company intranet 10 to external networks via various routes 30a, 30b. Each of the at least two routes is associated with a plurality of IP addresses. Each route may be for example a route via a certain ISP, which has its own IP address space for use by the parties who access an IP network such as the Internet via the ISP. However, the source 10 and node 20 entities may also exist in the same physical device such as a computer, in which case the IP datagram traffic is originated in the same computer which performs the functions of a node 20 as described in the following.

In the first step 100, the source 10 creates and sends a TCP SYN packet for initiating a TCP connection to the end node. After receiving the packet, the node 20 may translate the source IP address i.e. perform network address translation, if that is needed for transmission of the packet via the first route. In any case, the node 20 sends 105 the first SYN packet, i.e. a TCP packet in which the SYN bit is set and the ACK bit is not set to the end node via the first route 30a. Next, the node 20 copies 110 the first packet, translates 115 the source IP address, and transmits 120 the packet to the end node via the second route 30b. The node 20 then waits for the first response SYN+ACK packet from either of the routes to arrive. When the SYN+ACK packet arrives 125 in this example from the second route, the node selects 130 route 2 to be used for the continuation. The node 20 performs any necessary network address translations and forwards 135 the SYN+ACK packet to the source 10. Consequently, the source 10 finishes the three-way TCP handshake by sending 140 an ACK packet back, which packet is forwarded 145 after corresponding network address translations to the end node via the second route 30b. When the node 20 receives 150 a SYN+ACK packet from the first route 30a, the node 20 sends 155 a RST packet to route 1 to cancel the connection via route 1.

In a SYN+ACK packet, the SYN and ACK bits are set, and in a RST packet, the RST bit is set.

The order of steps in FIG. 7 is an example only, and may be different in other embodiments of the invention. Further, the step of copying a packet may be effected in the step of sending a packet. For example, in one advantageous embodiment of the invention the node 20 comprises a buffer, to which the node 20 writes the packet received from the source. The node 20 can then translate the source IP address in the buffer to correspond to the route to which the packet will be sent next, and send a copy of the packet to the route.

The invention is not limited only to TCP connections for transmitting HTTP traffic since the invention can be used with many other protocols used on top of the IP protocols. For example, various protocols for carrying speech data can be used as the second protocol, whereby the inventive method allows load sharing of speech connections. The invention may be used with many different protocols, such as protocols for data transfer, speech, and video transmission. A reliable implementation of the invention only requires, that the start and the end of a connection according to the second protocol can be recognized by the entity such as a network element performing the method according to the invention. For example, the start of a TCP connection can be observed by observing the status bits of a TCP header: a TCP connection is started with a packet having the SYN bit set and the ACK bit not set, and the end of a connection is marked by a TCP packet having the FIN bit set. For speech connections according to for example some of the H.300-series protocols, the contents of the IP packets carrying the messages need to be read and interpreted for recognizing the messages indicating the start and the end of a connection. The second protocol may also be the RTSP protocol (real time streanmng protocol), for example. The start and end of a connection is readily detected from signalling according to the RTSP protocol.

The inventive method can be used with both IP version 4 and IP version 6 protocols.

In a further advantageous embodiment of the invention, the time elapsed between the sending of the first datagram via a route and the reception of a first datagram comprising information of a predefined type from the routes is measured for each route, and the route having the shortest measured time is selected to be used for the new connection. Further, the measured time for the routes to a end node may be stored in a memory means. Later, if a new connection is to be established to the same end node, the stored times may be used as a basis for selection of a route without replication of packets to various routes, if the stored time results are recent enough to have any trustworthiness. Such an arrangement can reduce signalling caused by the inventive method.

Further, the steps of setting or translating of source IP address of a datagram may also comprise the step of setting or translating of source TCP address of the datagram.

In an advantageous embodiment of the invention, the network element performing the inventive method performs the load sharing of connections only for a certain protocol or certain group of protocols used on top of the IP protocols. For example, the network element may for example only perform load sharing of TCP connections, or load sharing of TCP connections and speech connections. For the rest of IP traffic, the network element may function as a transparent proxy using a predefined route for the rest of the IP traffic. The network element may also act as a conventional network address translating function for the rest of the IP traffic, if that is needed in a particular configuration.

Figure 8:
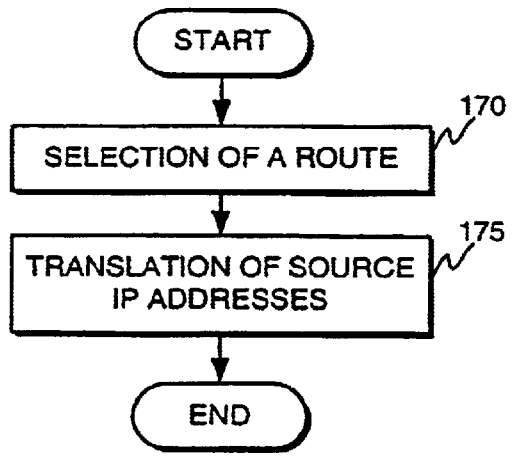
FIG. 8 illustrates a flow chart of an advantageous embodiment of the invention.

The previous embodiments represent particularly advantageous embodiments of the invention. In the following, a more general view of the invention is presented with reference to FIG. 8. According to the method, a route is selected 170 for a new connection to be established between the source node and an end node for transmission of packet traffic, the selected route is taken into use by translating 175 source IP addresses of packets transmitted from the source node to said end node to an IP address associated with the selected route, and said selection of a route is performed on the basis of predefined criteria.

Preferably, said selection of a route is performed to balance the load of new connections between the plurality of possible routes.

Preferably, the source node is connected to a first IP network, said end node is connected to a second IP network, said first and second networks are connected via a plurality of paths, and each path of said plurality of paths corresponds to one route of the plurality of possible routes.

In various embodiments of the invention, various ways of performing the selection can be used. For example, as described previously, the selection may be performed on the basis of round trip times measured by a packet replication method. However, other ways can be used as well. For example, the performance of the routes can be monitored continuously or for a certain period for obtaining statistical data of the performance of the routes, and the optimal route can be selected based on the measured statistics. Further, other types of load balancing algorithms such as those described in RFC 2391 can be used as well for making the decision about the selection of a route. Correspondingly, the predefined criteria as mentioned in the claims can be of many different kinds.

Figure 9:
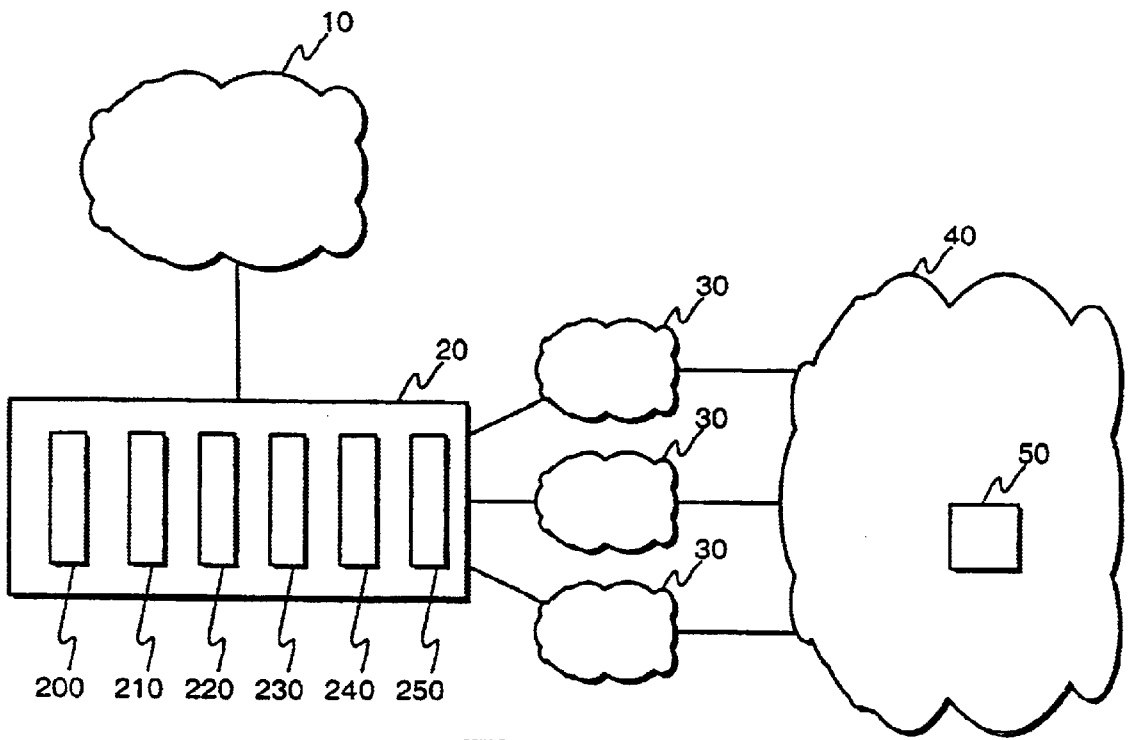
FIG. 9 illustrates a system and a network element according to an advantageous embodiment of the invention.

FIG. 9 illustrates a system according to an advantageous embodiment of the invention. FIG. 9 shows an internal IP network 10, an external network 40, a network element 20, three different routes 30 between the network element 20 and an external network 40, and an end node 50 in the external network. The system of FIG. 9 can be used for distribution of connections between a plurality of routes between a source node and end nodes, each of the routes being associated with a plurality of IP addresses. The routes may correspond to different internet service providers, for example. The system is in FIG. 9 realized in a network element 20 connecting the internal or the source network 10 to external networks 30, 40.

However, the system may also be realized in more than one physically separate device, whereby the invention is not limited to realization of the system in a single computing device. The system comprises means 250 for selecting a route for a new connection to be established between the source node and an end node for transmission of packet traffic, means 230 for translating source IP addresses of packets for transmission from the source node to said end node to an IP address associated with the selected route, said means for selecting a route being arranged to select a route on the basis of predefined criteria.

Preferably, said means for selecting a route is arranged to perform the selection for balancing the load of new connections between the plurality of possible routes.

FIG. 9 illustrates also a further embodiment of the invention. According to the embodiment, the system comprises means 200 for detecting an IP datagram destined to an end node comprising a setup message according to a second protocol, means 210 for sending said IP datagram to a first route of the plurality of routes for transmission to said end node, means 220 for copying said IP datagram for creating a second IP datagram for transmission to said end node via a second route of the plurality of routes, means 230 for translating the source IP address of said second IP datagram to an IP address belonging to the plurality of IP addresses associated with said second route, and means 240 for sending said second IP datagram to said second route for transmission to said end node.

Advantageously the means 200, 210, 220, 230, 240 are realized using software instructions stored in a memory means of the computer device or the computer devices used for realizing the system, which instructions are executed by the processing units of the computer device or the computer devices.

The invention has several advantages. For example, the invention offers a solution that does not require changes to clients or servers within the source network. Further, the inventive method can be tailored to provide load sharing for certain individual services or for all services used by a site. The inventive functionality can be integrated to firewalls, transparent HTTP proxies, or it can be realized for example using a dedicated gateway device. The inventive method is especially suitable for load-balancing the IMTP protocol that forms out more than 90% of Internet traffic volume.

The invention can also be used to increase the reliability of connections between a private network and an external IP network such as the Internet. If one of the routes between the two networks fail, the inventive method can automatically distribute all new connections to the rest of the routes. In such a case, the predefined criteria used in selection of the route advantageously take into account the state of the routes.

The inventive method can also take into account the differences in the performance of the parts of the routes which are inside the external network such as the Internet, if the route selection decisions are at least partly based on the performance of the routes. Therefore, not only the performance of the links via the internet service providers are taken into account, but also the performance of that part of the connections, which extend from the connecting point between the ISP equipment and the Internet to the end node within the Internet.

The term end node in this application is used to mean a node, through which all the routes pass after traversing through at least partly separate nodes within a network. The end node does not need to be the final end point of a connection. For example, the end node may be an IP telephony server, which then forwards the received data stream to an IP telephone. In this example, the routes between which the selection is made are between the source node and the IP telephony server, and the IP telephony server is the end node according to the terminology of this application.

Internet service providers have remarkable differences in international connections and the Internet changes all the time. The invention allows dynamical selection of the fastest ISP for each outgoing TCP/IP connection, i.e. the user has always the best possible connection to the destination. The invention removes the need for complicated BGP-4 multi-home routing configurations. Further, the invention makes it easy to deploy new ISP connections.

The invention can be used in such configurations, which have more than one route between a computer node and an IP network. For example, a company may have a connection to the Internet through more than one internet service provider for obtaining enough bandwith and reliability. The invention can also be used by internet service providers having more than one communication link to the Internet.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

What is claimed is:

1. Method for distribution of connections between a plurality of possible routes for transmission of IP packet traffic between a source node and end nodes, each of the routes being associated with a plurality of IP addresses, wherein
   a route is selected for a new connection to be established between the source node and an end node for transmission of packet traffic,
   the selected route is taken into use by translating source IP addresses of packets transmitted from the source node to said end node to an IP address associated with the selected route, and
   said selection of a route is performed on the basis of predefined criteria so that the route having fastest response time is selected as the route to be used.

2. Method according to claim 1, wherein
   the source node is connected to a first IP network,
   said end node is connected to a second IP network,
   said first and second networks are connected via a plurality of paths, and
   each path of said plurality of paths corresponds to one route of the plurality of possible routes.

3. A Method for distribution of connections between a plurality of possible routes for transmission of IP packet traffic between a source node and end nodes, each of the routes being associated with a plurality of IP addresses, the connections using the Internet Protocol (IP) and at least one second protocol, the method comprising at least steps, in which
   a route is selected for a new connection to be established between the source node and an end node for transmission of packet traffic,
   the selected route is taken into use by translating source IP addresses of packets transmitted from the source node to said end node to an IP address associated with the selected route, and
   said selection of a route including the steps
   a first IP datagram comprising a setup message of a second protocol is created for initiating a new connection to an end node using said second protocol,
   said first IP datagram is sent through a first route of the routes between the source node and said end node,
   said first IP datagram is copied for creating a second IP datagram for sending through a second route of the routes between the source node and said end node,
   the source IP address of said second IP datagram is translated to an IP address selected from the plurality of IP addresses associated with said second route,
   said second IP datagram is transmitted via said second route to said end node,
   first datagram comprising information of a predefined type is received from said end node via one of the routes, and
   the route from which said first datagram comprising information of said predefined type is received is selected as the route to be used.

4. Method according to claim 3, wherein said selection of a route is performed to balance the load of new connections between the plurality of possible routes.

5. A method according to claim 3, wherein the method comprises a step, in which the source IP address of said first IP datagram is translated to an IP address selected from the plurality of IP addresses associated with said first route.

6. A method according to claim 3, wherein said first datagram comprising information of a predefined type is a first response datagram sent by said end node as a response to one of said first and second IP datagrams.

7. A method according to claim 3, wherein connection setup signalling according to said second protocol is continued via the selected route.

8. A method according to claim 3, wherein the method further comprises the steps: after sending said first and second IP datagrams, connection setup signalling procedure is continued via said first and said second route, and said first datagram comprising information of a predefined type is a first IP datagram comprising payload data according to the second protocol sent by said end node.

9. A method according to claim 3, wherein said second protocol is the Transmission Control Protocol (TCP).

10. A method according to claim 1, wherein said IP protocol is IP version 4 protocol.

11. A method according to claim 1, wherein said IP protocol is IP version 6 protocol.

12. A method according to claim 3, wherein said second protocol is a protocol for carrying speech data.

13. System for distribution of connections between a plurality of possible routes for transmission of IP packet traffic between a source node and end nodes, each of the routes being associated with a plurality of IP addresses, comprising:
    means for selecting a route for a new connection to be established between a source node and an end node for transmission of packet traffic,
    means for translating source IP addresses of packets for transmission from said source node to said end node to an IP address associated with said selected route, said means for selecting a route being arranged to select a route on the basis of predefined criteria so that the route having fastest response time is selected as the route to be used.

14. System according to claim 13, characterized in that said means for selecting a route is arranged to perform the selection for balancing the load of new connections between the plurality of possible routes.

15. A System for distribution of connections between a plurality of possible routes for transmission of IP packet traffic between a source node and end nodes, each of the routes being associated with a plurality of IP addresses, the system comprising
    means for selecting a route for a new connection to be established between the source node and an end node for transmission of packet traffic,
    means for translating source IP addresses of packets for transmission from the source node to said end node to an IP address associated with the selected route, said means for selecting a route including
    means for detecting an IP datagram destined to an end node comprising a setup message according to a second protocol,
    means for sending said IP datagram to a first route of the plurality of routes for transmission to said end node,
    means for copying said IP datagram for creating a second IP datagram for transmission to said end node via a second route of the plurality of routes,
    means for translating the source IP address of said second IP datagram to an IP address belonging to the plurality of IP addresses associated with said second route, and means for sending said second IP datagram to said second route for transmission to said end node.

16. A network element for distribution of connections between a plurality of possible routes for transmission of Internet Protocol (IP) packet traffic between a source node and end nodes, each of the routes being associated with a plurality of IP addresses, the network element comprises:

means for creating at least first and second datagrams, each constituting a setup message in a second protocol which runs over said IP protocol, said first and second datagrams being copies of each other and being attempts to establish a connection between said source node and said end node, said first datagram having a source IP address associated with a first route between said source node and said end node;

means for transmitting said first datagram via said first route;

means for translating said source IP address in said second datagram which was copied from said first datagram to an IP address associated with a second route between said source node and said end node;

means for transmitting said second datagram to said end node via said second route;

means for determining which of said first and second routes has the lowest load as judged by it having the fastest response time in transmitting back to said source node a datagram of a predetermined type transmitted from said end node;

means for selecting a route for subsequent transmissions between said source node and said end node on the basis of predefined criteria so that the route having fastest response time in transmitting said datagram of a predetermined type back to said source node is selected as the route to be used.

17. A network element for distribution of connections between a plurality of possible routes for transmission of IP packet traffic between a source node and end nodes, each of the routes being associated with a plurality of IP addresses, the system network element comprising:

means for selecting a route for a new connection to be established between the source node and an end node for transmission of packet traffic, means for translating source IP addresses of packets for transmission from the source node to said end node to an IP address associated with the selected route, said means for selecting a route including means for detecting an IP datagram destined to an end node comprising a setup message according to a second protocol, means for sending said IP datagram to a first route of the plurality of routes for transmission to said end node, means for copying said IP datagram for creating a second IP datagram for transmission to said end node via a second route of the plurality of routes, means for translating the source IP address of said second IP datagram to an IP address belonging to the plurality of IP addresses associated with said second route, and means for sending said second IP datagram to said second route for transmission to said end node; and means for receiving a first-in-time reply datagram to said setup message sent via either said first route or said second route, and for selecting the route through said first-in-time reply datagram was received as the route to use for further transmissions between said source node and said end node.

18. Method according to claim 1, wherein said selection of a route includes the steps:

(i) replicating a connection setup packet through each of said plurality of possible routes to be tested, (ii) receiving a reply packet relating to the connection setup packet through at least one of the plurality of possible routes to be tested, (iii) selecting the one of the plurality of routes having the fastest reply time to the connection setup packet.

* * * * *